United States Patent [19]
Hartz

[11] 3,812,270
[45] May 21, 1974

[54] METHOD OF FEEDING FILLED CONTAINERS TO A RETORT OR THE LIKE

[75] Inventor: Gerald Hartz, Wheaton, Ill.

[73] Assignee: Reynolds Metals Company, Richmond, Va.

[22] Filed: Jan. 14, 1972

[21] Appl. No.: 217,802

Related U.S. Application Data

[62] Division of Ser. No. 24,089, March 31, 1970, Pat. No. 3,662,676.

[52] U.S. Cl............ 426/231, 426/412, 426/392, 426/521
[51] Int. Cl............................................. A23l 3/04
[58] Field of Search......... 99/214, 215, 182, 171 H, 99/360, 373, 404–407, 443, 1; 53/246, 248, 249, 251; 73/52

[56] References Cited
UNITED STATES PATENTS

| | | | |
|---|---|---|---|
| 725,489 | 4/1903 | Schirmer | 99/360 |
| 1,923,421 | 8/1933 | Chapman | 99/214 X |
| 2,380,984 | 8/1945 | Moeller | 99/214 X |
| 2,829,477 | 4/1958 | Folly | 53/246 X |
| 3,425,184 | 2/1969 | Heliot | 53/251 X |
| 3,469,671 | 9/1969 | Mencacci et al. | 99/360 X |

*Primary Examiner*—Norman Yudkoff
*Assistant Examiner*—Kenneth P. Van Wyck
*Attorney, Agent, or Firm*—Glenn, Palmer, Lyne & Gibbs

[57] ABSTRACT

A method of feeding filled containers to a retort or the like. A pocket conveyor is immersed in a suitable liquid, such as water, and has filled containers transferred thereto from an input conveyor. The pocket conveyor is incrementally advanced in synchronism with the advance of filled containers on the input conveyor with the presence of individual containers being detected by a suitable means such as a photocell. The liquid is preferably heated so as to maintain the contents of the containers at or near the temperature at which they have been filled. The liquid is maintained at such a height so as to effect a cushioning of the filled containers as they are transferred from the input conveyor to the pocket conveyor. In addition, the liquid functions to permit a quality control inspection on the containers to be performed in that those containers having too much air therein float in the liquid.

9 Claims, 1 Drawing Figure

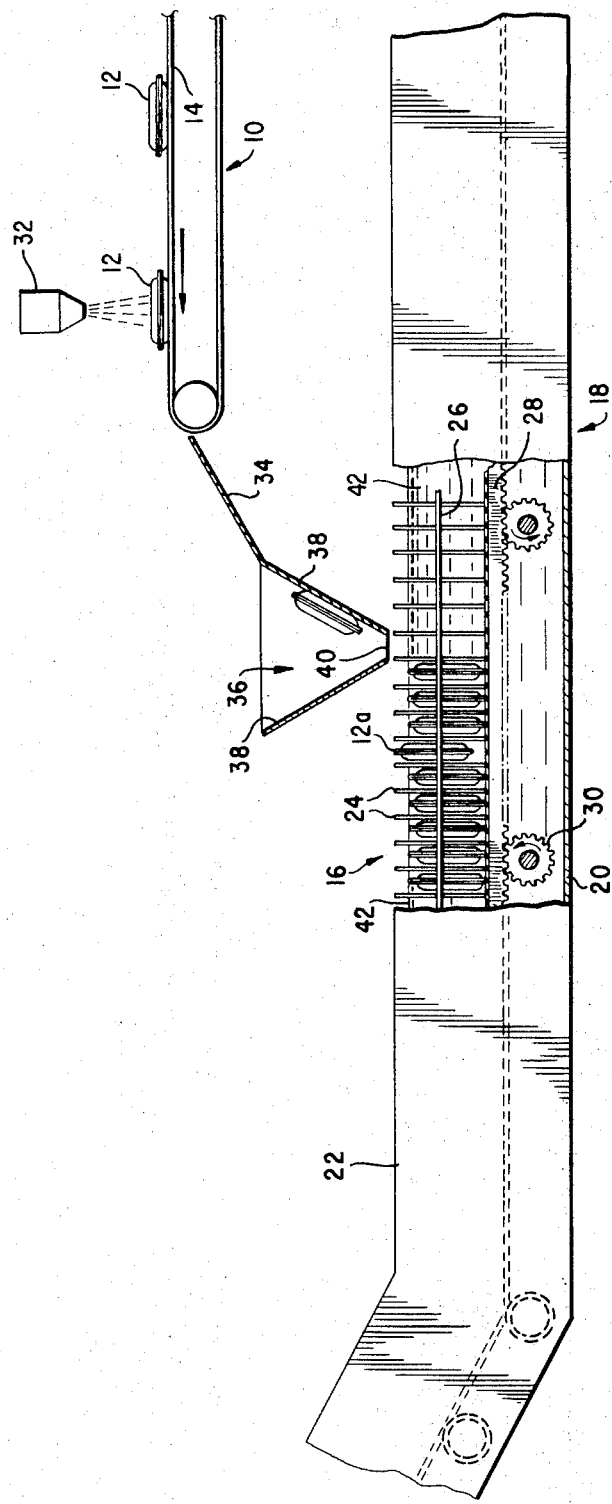

METHOD OF FEEDING FILLED CONTAINERS TO A RETORT OR THE LIKE

This application is a division of U.S. Ser. No. 24,089, filed Mar. 31, 1970, now U.S. Pat. No. 3,662,676 entitled METHOD OF AND APPARATUS FOR FEEDING FILLED CONTAINERS TO A RETORT OR THE LIKE.

This invention relates to a method of feeding filled containers, and more particularly to such a method wherein the filled containers are deposited in a rack loading device preparatory to being processed in a retort or other cooking apparatus.

It has long been desirable to avoid hand loading of filled containers onto a rack loading device so as to eliminate the costly handling thereof. However, many containers pose handling problems especially when they are transferred from one conveyor to another. Flexible pouches, for example, will not withstand rough handling and are susceptible to being ruptured in the sealed area. Smooth wall containers on the other hand, suffer from denting which results in an unsightly container.

It is also desirable to be able to perform a quality control check or inspection of the containers and especially one which indicates the amount of air which is left in the container. Too much air in a pouch, for example, affects its processing especially where the pouches are processed on a heat-time cycle. Finally, it is desirable to maintain the temperature of the product within the container at or near the temperature at which they have been filled.

In accordance with the present invention, a method of loading filled containers onto a pocket conveyor is devised wherein the loading may be accomplished automatically without either rupturing the seam of the pouch material or denting smooth wall containers. In addition, the method of the present invention permits a quality control check or inspection to be performed on the containers by detecting those containers having too much air therein. Finally, the method of the present invention permits the container to be maintained at or near their filling temperature.

In accordance with the present invention, a pocket conveyor is immersed in a liquid and filled containers are fed forward along an input conveyor, transferred from the input conveyor to the pocket conveyor, after which the filled containers are inspected to determine if an excess of air is trapped therein.

The liquid is preferably heated so as to maintain the temperature of the product within the container at or near the temperature at which the containers have been filled. The liquid used to immerse the pocket conveyor is maintained at such a height so as to effect a cushioning of the containers when they are transferred from the input conveyor to the pocket conveyor. In order to ensure that each pocket on the pocket conveyor is filled, means are provided for detecting the the presence of filled containers on the input conveyor and for advancing the pocket conveyor in synchronism with the detection of filled containers on the input conveyor.

The inherent advantages and improvement of the present invention will become more readily apparent upon considering the following detailed description of the invention and by reference to the drawing in which:

The sole FIGURE is a fragmmentary side elevational view of the apparatus of the present invention with portions thereof broken away.

The designation "input conveyor" and "pocket conveyor" are used throughout the description as a matter of convenience and are used in a descriptive sense and not in a limiting manner. It is to be understood that the terms cover the transfer of articles from one feed means to another feed means where the latter feed means functions under a liquid.

Referring now to the drawing, there is shown an input conveyor, indicated generally at 10, which feeds a number of filled containers 12 forwardly from right to left in the FIGURE along an upper flight 14 of input conveyor 10. For purposes of this invention, filled containers 12 may be pouches or smooth wall containers with the drawing showing pouches as a typical container. In actual practice, the containers 12 have just been filled, preferably at an elevated temperature, completely sealed, then fed forwardly by means of conveyor 10 toward a pocket conveyor, indicated generally at 16.

A trough or housing, indicated generally at 18 having a bottom 20 and suitable side walls one of which is indicated at 22 permits the pocket conveyor 16 to be immersed in a liquid for purposes to be described hereinafter.

The pocket conveyor 16 is provided with a plurality of upstanding divider members 24 which are attached to and retained by a pair of suitable side guide members, one of which is shown at 26, in order to provide pockets for the reception of containers 12 therein. Pocket conveyor 16 is advanced by rack means 28 which meshes with gear means such as is indicated at 30 in order to provide an incremental advance thereto.

A photocell means 32 associated with the input conveyor 10 detects the presence of articles 12 being fed forwardly on input conveyor 10 so as to provide the signal for the incremental advance to gear 30 and thence to rack 28 and pocket conveyor 16.

Any suitable photocell means 32 may be used for purposes of this invention. Thus if the article 12 is made of a highly reflective material such as aluminum, the photocell 32 may be actuated solely by reflected light from the container 12.

After detection by the photocell means, 32 the containers 12 are transferred to the pocket conveyor 16 by means of slide 34 and a hopper, indicated generally at 36. Hopper 36 is provided with side walls 38 and a bottom opening designated 40.

The liquid 42 within which the pocket conveyor 16 is immersed is preferably heated so as to maintain the temperature of the product within filled containers 12 at or near the filling temperature therefor. The liquid 42 is filled to such a height so as to effect a cushioning of containers 12 as they are transferred from the input conveyor 10 to the pocket conveyor 16 through the intermediary of slide 34 and hopper 36. It is desirable to have the divider members 24 extend above or at least near the upper surface of liquid 42 to provide a guiding function and to ensure that an individual container 12 is inserted within the desired pocket. That is, reliance cannot be made on having the containers sinking aimlessly toward the pockets in pocket conveyor 16. In addition to maintaining the container at the filling temperature and cushioning it as it is dropped into the pocket conveyor 16, the liquid 42 which immerses conveyor 16 also functions to perform a quality control check or inspection of an individual container. Thus an indication is given that a container has an excess of air therein whereby the container floats as is designated at 12a so that it may be suitably tagged or removed.

It is within the scope of this invention to use a liquid other than water which has a specific gravity different from that of water such that the container will float for a prescribed minimum amount of air entrapped within the container. Mixtures of different fluids including water are also possible so as to obtain a desired specific gravity.

While the present invention has been described with respect to a flow process where the number of containers on the input conveyor substantially matches the number of pockets in the pocket conveyor, the present invention may also be combined with an escapement mechanism which controls the output from the hopper 36. Such a change permits the apparatus to be employed in a pasteurization process, for example, wherein the pocket conveyor 16 passes first through a tank where the containers are immersed in water, that is, heated to pasteurize the food product within the pouches and is then lifted from the pasteurizing tank into a cooling tank with the aid of suitable guide rollers. The length of travel through the pasteurizing tank is made sufficiently long for a given intermittent advance to ensure the proper amount of pasteurization. The pouches are unloaded from the pocket conveyor after emergence from the cooling tank and then returned in a continuous loop to the input to the pasteurizing tank beneath the hopper discharge.

It may be convenient to fill every other pocket in the pocket conveyor 16 with the aid of the escapement mechanism. This has the added advantage of assuring ample circulation of water around an individual package in the pasteurizing tank.

A typical temperature for the water in the pasteurizing tank is from 200° to 210°F. Such a pasteurizing process is particularly well suited to high acid foods, such as sauerkraut or the like.

While presently preferred embodiments of the invention have been described and illustrated, it will be recognized that the invention may be otherwise variously embodied and practiced within the scope of the claims which follow.

What is claimed is:

1. A method of feeding filled flexible pouches from an input conveyor to a pocket conveyor enroute to a retort or the like comprising the steps of
   a. immersing said pocket conveyor in a liquid,
   b. feeding said filled flexible pouches forward along said input conveyor,
   c. transferring said filled flexible pouches by gravity feed from said input conveyor to said pocket conveyor,
   d. and detecting for the presence of an excess of air due to buoyancy of said flexible pouches and removing those of said filled flexible pouches having been detected for an excess of air therein.

2. A method of feeding filled flexible pouches from an input conveyor to a pocket conveyor as defined in claim 1 including the additional step of heating said liquid which immerses said pocket conveyor.

3. A method of feeding filled flexible pouches from an input conveyor to a pocket conveyor as defined in claim 1 wherein the liquid used to immerse said pocket conveyor is of such a height so as to effect a sufficient cushioning of said flexible pouches to avoid rupture of a seam of said flexible pouches when said pouches are transferred from said input conveyor to said pocket conveyor.

4. A method of feeding filled flexible pouches from an input conveyor to a pocket conveyor as defined in claim 1 including the additional steps of
   a. detecting the presence of filled flexible pouches on said input conveyor prior to the transference of said pouches to said pocket conveyor,
   b. and advancing said pocket conveyor in synchronism with the detection of filled containers on said input conveyor.

5. A method of feeding filled flexible pouches from an input conveyor to a pocket conveyor as defined in claim 4 including the additional step of heating said liquid which immerses in said pocket conveyor.

6. A method of feeding filled flexible pouches from an input conveyor to a pocket conveyor as defined in claim 4 wherein the liquid used to immerse said pocket conveyor is of such a height as to effect a sufficient cushioning of said felxible pouches to avoid rupture of a seam of said flexible pouches when said pouches are transferred from said input conveyor to said pocket conveyor.

7. A method of feeding filled flexible pouches from an input conveyor to a pocket conveyor as defined in claim 2 including the additional steps of
   a. detecting the presence of filled flexible pouches on said input conveyor prior to the transference of said pouches to said pocket conveyor,
   b. and advancing said pocket conveyor in synchronism with the detection of filled flexible pouches on said input conveyor.

8. A method of feeding filled flexible pouches from an input conveyor to a pocket conveyor as defined in claim 2 wherein the liquid used to immerse said pocket conveyor is of such a height as to effect a cushioning of said containers when they are transferred from said input conveyor to said pocket conveyor.

9. A method of feeding filled flexible pouches from an input conveyor to a pocket conveyor as defined in claim 7 wherein the liquid used to immerse said pocket conveyor is of such a height so as to effect a sufficient cushioning of said flexible pouches to avoid rupture of a seam of said flexible pouches when said pouches are transferred from said input conveyor to said pocket conveyor.

* * * * *